Patented Dec. 4, 1951

2,577,133

UNITED STATES PATENT OFFICE 2,577,133

PREPARATION OF KETO-CARBOXYLIC ACIDS AND THEIR DERIVATIVES

Elbert C. Ladd, Passaic, N. J., assignor to United States Rubber Company, New York, N. Y., a corporation of New Jersey No Drawing. Application March 13, 1947, Serial No. 734,540

6 Claims. (Cl. 260—483)

This invention relates to improvements in the preparation of keto-carboxylic acids and their derivatives.

It is known that certain olefinic acids, e. g., acrylic acids, and their esters, and certain derivatives of vinyl alcohol, e. g., vinyl halides, and vinyl esters of fatty acids are readily polymerizable in the presence of ultraviolet light or peroxygen type catalysts to form high molecular weight resins.

According to the present invention, olefinic carboxylic acids, or their hydrolyzable derivatives, are reacted with certain aldehydes, namely n-alkanals, sec-alkanals, cycloalkanecarboxaldehydes, aralkanals, and aromatic aldehydes in the presence of ultraviolet light or a catalytic material which will decompose to give free radicals, to form keto-carboxylic acids or derivatives thereof of the formula R—CO—(X)$_n$—H, where R is the n-alkyl, sec-alkyl, cycloalkyl, aryl or aralkyl radical of the aldehyde reactant and X is the divalent radical derived from the olefinic carboxylic acid, or from a hydrolyzable derivative thereof, i. e., the divalent radical derived from an ester, nitrile, amide, acyl halide, or anhydride of the olefinic carboxylic acid, and $n$ is an integer from 1 to 5.

The process of my invention is carried out by reacting a mixture of the aldehyde, and the olefinic carboxylic acid or its hydrolyzable derivative, in the presence or absence of an inert diluent, such as n-hexane, cyclohexane or benzene, under free radical conditions, that is, in the presence of a source of free radicals, e. g., ultraviolet light or a catalyst which will decompose to give free radicals, the temperature employed being sufficient to effect decomposition of any such catalytic material with consequent production of free radicals. Examples of the aldehydes suitable for the process of my invention are acetaldehyde, propionaldehyde, butyraldehyde, isobutyraldehyde, heptaldehyde, octaldehyde, cyclopentane-carboxaldehyde, cyclohexane-carboxaldehyde, phenylacetaldehyde, benzaldehyde. The olefinic carboxylic acid or derivative may contain one or more ethylenic linkages and may be a monocarboxylic or a polycarboxylic acid or a hydrolyzable derivative thereof. Examples of such olefinic carboxylic acids and their derivatives are acrylic acid, ethacrylic acid, crotonic acid, 4-pentenoic acid, undecylenic acid, maleic acid, fumaric acid, itaconic acid, muconic acid, aconitic acid, oleic acid, linoleic acid; their esters, e. g., alkyl esters, such as butyl acrylate, methyl ethacrylate, methyl undecylenate, dimethyl maleate, diethyl fumarate, dihexyl itaconate, and cycloalkyl esters, e. g., cyclohexyl acrylate; other hydrolyzable derivatives such as nitriles, e. g., acrylic nitrile, crotonic nitrile; amides, e. g., acrylamide; halides, e. g., acrylyl chloride; anhydrides, e. g., maleic anhydride. The most reactive olefinic carboxylic acids in the process of my invention are those in which at least one of the olefinically bonded carbon atoms contains a hydrogen atom attached thereto. The preferred olefinic carboxylic acids and derivatives are those compounds which contain a terminal olefinic linkage and/or an olefinic linkage in the alpha position to the carboxyl group or its hydrolyzable derivative. Examples of catalysts suitable for the process of my invention which will decompose to give free radicals are peroxygen-type catalysts, viz: organic peroxides, e. g. acyl peroxides such as diacetyl peroxide, dibenzoyl peroxide, acetyl benzoyl peroxide, and alkyl peroxides such as tertiarybutyl hydroperoxide; hydrogen peroxide; per-salts, e. g. alkali persulfates, alkali perborates, alkali percarbonates; hydrazine derivatives, e. g. hydrazine sulfate, hydrazine hydrochloride, dibenzoyl hydrazine; organometallic compounds which decompose thermally to give free radicals, e. g. metal alkyls such as tetraethyl-lead. The type of catalysts exemplified above which will decompose to give free radicals are well known and should not be confused with Friedel-Crafts type catalysts, such as aluminum chloride, boron trifluoride, and acids such as sulfuric and hydrofluoric acids, which are not effective in the present process to give the liquid low molecular weight ketones of the present invention. Conversely, as known, the catalysts used in the process of the present invention are not effective as catalysts in Friedel-Crafts reactions. The organic peroxides are the present preferred catalysts for the process of the present invention.

The amounts of the aldehyde and olefinic carboxylic acid or derivative may be varied over a considerable range, it being preferable to employ 1 to 20 mols of aldehyde per mol of olefinic carboxylic acid or derivative thereof, the higher molar ratios being particularly useful in securing the optimum yield of low molecular weight keto-acids or their derivatives. In general, the higher the proportion of the aldehyde present, the greater is the proportion of low molecular weight keto-acids or their derivatives in the reaction product, i. e., products of the above type formula R—CO—(X)$_n$—H, where $n$ is 1 and 2. Where it is inconvenient or impractical to employ a large excess of the aldehyde reactant, the olefinic acid or derivative may be added incrementally to the reaction mixture, thus in effect maintaining a considerable excess of the aldehyde throughout the major proportion of the reaction. The catalyst may be ultraviolet light or a catalytic material, as described above, which will decompose to give free radicals, in which latter case the amount of catalyst employed is not critical, generally an amount of such catalytic material from 0.5 to 15 mol percent of the olefinic acid or derivative being satisfactory. The temperature of the reaction may vary over a wide range depending particularly on the catalyst used, which must be decomposed under the reaction conditions to produce free radicals. For practical purposes, reaction temperatures of about 25° C. to 150° C., preferably in the range of 60° C. to 100° C., particularly for organic peroxide catalysts, have proven satisfactory. When the reactants boil within this temperature range, it is convenient as well as economical to carry out the reaction at the reflux temperature of the reaction mixture, provided this temperature is sufficiently high to effect decomposition of the catalytic material employed, such as a peroxidic compound. In the case of the more volatile reactants, it may be necessary to carry out the reactions in closed vessels capable of withstanding superatmospheric pressure. While the length of time the reaction is allowed to proceed naturally depends on various factors, such as the temperatures and pressures used, the reactants and catalysts employed, and the acceptable yield of keto-acid or derivative produced, generally the time of reaction may be from 1 to 50 or more hours. The reaction may be halted by cooling, and the unreacted starting materials removed by evaporation under reduced pressure. The keto-acids or derivatives may be isolated from the reaction mixture by conventional methods, e. g. fractional distillation of the residue, or, in the case of very high boiling products, by fractional crystallization.

The following examples are illustrative of the invention:

*Example I*

A mixture of 86 parts of diethyl maleate and 360 parts of n-butyraldehyde was heated for thirty hours at approximately 76° C. during which time 16.6 parts of dibenzoyl peroxide were added in four approximately equal portions. The reaction was completed by heating for an additional seventeen hours. The reaction mixture was cooled, washed with aqueous sodium bicarbonate to remove acidic fragments from the decomposition of the peroxide, and dried over anhydrous magnesium sulfate. Fractional distillation yielded 53.8 parts of diethyl α-butyrosuccinate. Boiling point 102–104° C./1 mm.; $n_D^{20}=1.4392$. Analysis—Found: C, 59.50%; H, 8.27%; sapon. equiv., 120.7; mol. wt., 237. Theory: C, 59.00%; H, 8.25%; sapon. equiv., 122.14; mol. wt., 244.28. The distillation also yielded a smaller amount of a liquid which boiled at 145–7° C./1 mm.; $n_D^{20}=1.4600$; % C=62.24%; % H=8.12%; sapon. equiv.=120.

Five parts of the diethyl α-butyrosuccinate prepared above were refluxed for three hours with 50 parts of 10% aqueous sodium hydroxide. The reaction mixture was then cooled, extracted with diethyl ether and the alkaline layer separated and acidified with 6-normal hydrochloric acid. The acidified material was extracted with ether and dried over magnesium sulfate. The ether was then evaporated leaving the crude 4-ketoheptanoic acid, which crystallized upon standing. The 4-ketoheptanoic acid was recrystallized from n-hexane. The compound melted at 46.5–48° C. Reported m. pt. 46–47° C. Analysis—Found: C, 58.39%; H, 8.36%; neutral. equiv., 145. Theory: C, 58.35%; H, 8.39%; neutral. equiv., 144.

*Example II*

To a mixture of 172 parts of diethyl fumarate and 720 parts of n-butyraldehyde at 75° C. were added 22 parts of dibenzoyl peroxide in the course of 32 hours. After heating for an additional 16 hours the reaction mixture was cooled and purified as in Example I to yield 102 parts of diethyl α-butyrosuccinate together with a smaller amount of higher boiling product.

*Example III*

A solution of 101 parts of undecylenic acid and 4 parts of dibenzoyl peroxide in 500 parts acetaldehyde was heated at 70° C. for 48 hours in an autoclave of approximately 1200 ml. capacity. Unreacted starting materials were then distilled off and the residue was recrystallized from n-hexane to yield 18 parts of 12-ketotridecanoic acid having a melting point of 71–72° C. The identity of the keto-acid was confirmed by the semi-carbazone derivative which melted at 136–138° C. Analysis—Found: N, 14.82%. Theory: N, 14.74%.

*Example IV*

A mixture of 200 parts of methyl undecylenate, 500 parts of acetaldehyde and 11 parts of dibenzoyl peroxide were heated at 70° C. for 48 hours in a 1200 ml. autoclave. The reaction mixture was purified as in Example I to yield 74 parts of methyl 12-ketotridecanoate boiling in the range of 122–133° C./0.1 mm. Analysis—Found: C, 69.5%; H, 10.83%. Theory: C, 69.37%; H, 10.81%. Semi-carbazone derivative, melting point 114–116° C. Analysis—Found: N, 13.96%. Theory: N, 14.13%.

*Example V*

To 720 parts of n-butyraldehyde at 75–78° C. were added 86 parts of methyl acrylate dropwise in the course of 32 hours during which period 13.8 parts of dibenzoyl peroxide were likewise added in three, approximately equal portions. The reaction was completed by heating for an additional nineteen hours, after which the reaction product was purified as in Example I to yield 18.0 parts of methyl 4-keto-heptanoate. Boiling point 96.5–97° C./9 mm.; $n_D^{20}=1.4410$. The distillation also yielded a minor amount of higher boiling material. The identity of the keto-ester was confirmed by the 2,4-dinitrophenylhydrazone derivative which melted at 121.5°–122.5° C. Analysis—Found: N, 17.83%. Theory: N, 16.58%. Upon further purification of the keto-ester, the nitrogen content of its dinitrophenylhydrazone derivative checked even more closely with the theoretical value.

In view of the many changes and modifications that may be made without departing from the principles underlying the invention, reference should be made to the appended claims for an understanding of the protection afforded the invention.

Having thus described my invention, what I claim and desire to protect by Letters Patent is:

1. The process of making a monomeric lower dialkyl ester of an alpha-lower alkanoyl succinic acid which comprises heating a lower dialkyl ester of an acid selected from the group consisting of maleic and fumaric acids with a lower n-alkanal, in relative proportions of from 1 to 20 mols of said lower n-alkanal per mol of said ester, in the presence of a member of the group consisting of organic peroxides and actinic light at a temperature of from 60° C. to 100° C. until a monomeric lower dialkyl ester of an alpha-lower alkanoyl succinic acid having the formula

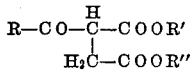

where R is the lower alkyl radical of said lower n-alkanal and R' and R" are the lower alkyl groups of said ester reactant, is formed, and isolating said monomeric ester having said formula from the resulting reaction mixture.

2. The process of making a monomeric lower dialkyl ester of an alpha-lower alkanoyl succinic acid which comprises heating a lower dialkyl ester of an acid selected from the group consisting of maleic and fumaric acids with a lower n-alkanal, in relative proportions of from 1 to 20 mols of said lower n-alkanal per mol of said ester, in the presence of dibenzoyl peroxide as a free radical reaction initiator at a temperature of from 60° C. to 100° C. until a monomeric lower dialkyl ester of an alpha-lower alkanoyl succinic acid having the formula

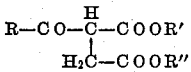

where R is the lower alkyl radical of said lower n-alkanal and R' and R" are the lower alkyl groups of said ester reactant, is formed, and isolating said monomeric ester having said formula from the resulting reaction mixture.

3. The process of making a monomeric lower dialkyl ester of an alpha-lower alkanoyl succinic acid which comprises heating a lower dialkyl ester of an acid selected from the group consisting of maleic and fumaric acids with a lower n-alkanal, in relative proportions of 10 mols of said lower n-alkanal per mol of said ester, in the presence of a member of the group consisting of organic perioxides and actinic light at a temperature of from 60° C. to 100° C. until a monomeric lower dialkyl ester of an alpha-lower alkanoyl succinic acid having the formula

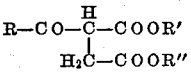

where R is the lower alkyl radical of said lower n-alkanal and R' and R" are the lower alkyl groups of said ester reactant, is formed, and isolating said monomeric ester having said formula from the resulting reaction mixture.

4. The process of making monomeric diethyl alpha-butyrosuccinate which comprises heating diethyl maleate with n-butyraldehyde in relative proportions of 10 mols of said n-butyraldehyde per mol of said diethyl maleate, in the presence of dibenzoyl peroxide as a free radical reaction initiator, at a temperature of from 60° C. to 100° C. until monomeric diethyl alpha-butyrosuccinate is formed, and isolating said monomeric diethyl alpha-butyrosuccinate from the resulting reaction mixture.

5. The process of making monomeric diethyl alpha-butyrosuccinate which comprises heating diethyl maleate with n-butyraldehyde, in relative proportions of 10 mols of said n-butyraldehyde per mol of said diethyl maleate, in the presence of dibenzoyl peroxide as a free radical reaction initiator at a temperature of approximately 76° C. for approximately 30 hours and thereby forming monomeric diethyl alpha-butyrosuccinate, and isolating said monomeric diethyl alpha-butyrosuccinate from the resulting reaction mixture.

6. The process of making monomeric diethyl alpha-butyrosuccinate which comprises heating diethyl fumarate with n-butyraldehyde in relative proportions of 10 mols of said n-butyraldehyde per mol of said diethyl fumarate, in the presence of dibenzoyl peroxide as a free radical reaction initiator, at a temperature of from 60° C. to 100° C. until monomeric diethyl alpha-butyrosuccinate is formed, and isolating said monomeric diethyl alpha-butyrosuccinate from the resulting reaction mixture.

ELBERT C. LADD.

REFERENCES CITED

The following references are of record in the file of this patent:

UNITED STATES PATENTS

| Number | Name | Date |
| --- | --- | --- |
| 1,872,834 | Skirrow | Aug. 23, 1932 |

OTHER REFERENCES

Danby et al.: "Proc. Royal Soc." (London, 1941), vol. A179, pp. 169–180.

Whitmore: "Organic Chemistry," page 313, D. Van Nostrand Co. Inc., N. Y. (1942).

Karrer: "Organic Chemistry," Nordemann Publishing Co., New York, N. Y., 1938, pp. 462–463.

Ellis: "Chemistry of Synthetic Resins, " vol. II, Reinhold Publishing Corp., New York, N. Y., 1935, page 1069.